United States Patent
Kasterstein et al.

(10) Patent No.: US 10,114,534 B2
(45) Date of Patent: *Oct. 30, 2018

(54) SYSTEM AND METHOD FOR DYNAMICALLY DISPLAYING PERSONALIZED HOME SCREENS RESPECTIVE OF USER QUERIES

(71) Applicant: Doat Media Ltd., Tel Aviv (IL)

(72) Inventors: Rami Kasterstein, Givataim (IL); Amihay Ben-David, London (GB); Joey Joseph Simhon, Ramat-Gan (IL)

(73) Assignee: Doat Media Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/850,200

(22) Filed: Sep. 10, 2015

(65) Prior Publication Data

US 2015/0378586 A1    Dec. 31, 2015

Related U.S. Application Data

(63) Continuation of application No. 13/712,563, filed on Dec. 12, 2012, now Pat. No. 9,141,702, which is a
(Continued)

(51) Int. Cl.
*G06F 17/30*    (2006.01)
*G06F 3/0484*   (2013.01)
*G06F 3/0481*   (2013.01)

(52) U.S. Cl.
CPC ...... *G06F 3/04847* (2013.01); *G06F 3/04817* (2013.01); *G06F 17/30716* (2013.01); *G06F 17/30864* (2013.01); *G06F 17/30867* (2013.01)

(58) Field of Classification Search
CPC ............ G06F 3/04847; G06F 3/04817; G06F 17/30867; G06F 17/30716; G06F 17/30864; H04L 65/403
(Continued)

(56) References Cited

U.S. PATENT DOCUMENTS 5,911,043 A    6/1999    Duffy et al.
6,101,529 A    8/2000    Chrabaszcz
(Continued)

FOREIGN PATENT DOCUMENTS

EP    2288113 A1    2/2011
JP    2009278342    11/2009
(Continued)

OTHER PUBLICATIONS

International Search Authority: "Written Opinion of the International Searching Authority" (PCT Rule 43bis.1) including International Search Report for International Patent Application No. PCT/US2012/059548; dated Mar. 26, 2013.
(Continued)

*Primary Examiner* — Evan Aspinwall
(74) *Attorney, Agent, or Firm* — M&B IP Analysts, LLC

(57) ABSTRACT

A system and method for dynamically generating and displaying a new home screen on a display of a user device are provided. The method comprises determining a user intent based on at least one input variable dynamically provided in real time; dynamically selecting a plurality of resources of information based on the user intent, wherein each selected resource has a representative icon; generating a new home screen including at least the icons of the plurality of dynamically selected resources; and causing a display of the new generated home screen on the user device.

21 Claims, 6 Drawing Sheets

Related U.S. Application Data continuation-in-part of application No. 13/156,999, filed on Jun. 9, 2011, now Pat. No. 9,323,844, and a continuation-in-part of application No. 13/296,619, filed on Nov. 15, 2011, now abandoned.

(60) Provisional application No. 61/653,562, filed on May 31, 2012, provisional application No. 61/468,095, filed on Mar. 28, 2011, provisional application No. 61/354,022, filed on Jun. 11, 2010.

(58) Field of Classification Search
USPC .......................................... 709/228; 707/706
See application file for complete search history.

(56) References Cited

U.S. PATENT DOCUMENTS

| | | |
|---|---|---|
| 6,484,162 B1 | 11/2002 | Edlund et al. |
| 6,560,590 B1 | 5/2003 | Shwe et al. |
| 6,564,213 B1 | 5/2003 | Ortega et al. |
| 6,605,121 B1 | 8/2003 | Roderick |
| 6,668,177 B2 | 12/2003 | Salmimaa et al. |
| 7,181,438 B1 | 2/2007 | Szabo |
| 7,266,588 B2 | 9/2007 | Oku |
| 7,302,272 B2 | 11/2007 | Ackley |
| 7,376,594 B2 | 5/2008 | Nigrin |
| 7,461,061 B2 | 12/2008 | Aravamudan et al. |
| 7,529,741 B2 | 5/2009 | Aravamudan et al. |
| 7,533,084 B2 | 5/2009 | Holloway et al. |
| 7,565,383 B2 | 7/2009 | Gebhart et al. |
| 7,599,925 B2 | 10/2009 | Larson et al. |
| 7,636,900 B2 | 12/2009 | Xia |
| 7,707,142 B1 | 4/2010 | Ionescu |
| 7,774,003 B1 | 8/2010 | Ortega et al. |
| 7,792,815 B2 | 9/2010 | Aravamudan et al. |
| 7,797,298 B2 | 9/2010 | Sareen et al. |
| 7,958,141 B2 | 6/2011 | Sundaresan et al. |
| 7,966,321 B2 | 6/2011 | Wolosin et al. |
| 7,974,976 B2 | 7/2011 | Yahia et al. |
| 8,032,666 B2 | 10/2011 | Srinivansan et al. |
| 8,073,860 B2 | 12/2011 | Venkataraman et al. |
| 8,086,604 B2 | 12/2011 | Arrouye et al. |
| 8,271,333 B1 | 9/2012 | Grigsby et al. |
| 8,312,484 B1 | 11/2012 | McCarty et al. |
| 8,392,449 B2 | 3/2013 | Pelenur et al. |
| 8,571,538 B2 | 10/2013 | Sprigg et al. |
| 8,572,129 B1 | 10/2013 | Lee et al. |
| 8,606,725 B1 | 12/2013 | Agichtein et al. |
| 8,626,589 B2 | 1/2014 | Sengupta et al. |
| 8,700,804 B1 | 4/2014 | Meyers et al. |
| 8,718,633 B2 | 5/2014 | Sprigg et al. |
| 8,793,265 B2 | 7/2014 | Song et al. |
| 8,799,273 B1 | 8/2014 | Chang et al. |
| 8,825,597 B1 | 9/2014 | Houston et al. |
| 8,843,853 B1 * | 9/2014 | Smoak ................ G06F 3/0482 715/788 |
| 2003/0018778 A1 | 1/2003 | Martin et al. |
| 2004/0186989 A1 | 9/2004 | Clapper |
| 2004/0229601 A1 | 11/2004 | Zabawskyj et al. |
| 2005/0071328 A1 | 3/2005 | Lawrence |
| 2005/0076367 A1 | 4/2005 | Johnson et al. |
| 2005/0102407 A1 | 5/2005 | Clapper |
| 2005/0108406 A1 * | 5/2005 | Lee ................ G06F 17/30867 709/228 |
| 2005/0149496 A1 | 7/2005 | Mukherjee et al. |
| 2005/0232423 A1 | 10/2005 | Horvitz et al. |
| 2005/0243019 A1 | 11/2005 | Fuller et al. |
| 2005/0283468 A1 | 12/2005 | Kamvar et al. |
| 2006/0004675 A1 | 1/2006 | Bennett et al. |
| 2006/0031529 A1 | 2/2006 | Keith |
| 2006/0064411 A1 | 3/2006 | Gross et al. |
| 2006/0085408 A1 | 4/2006 | Morsa |
| 2006/0089945 A1 | 4/2006 | Paval |
| 2006/0095389 A1 | 5/2006 | Hirota et al. |
| 2006/0112081 A1 | 5/2006 | Qureshi |
| 2006/0129931 A1 | 6/2006 | Simons et al. |
| 2006/0136403 A1 | 6/2006 | Koo |
| 2006/0167896 A1 | 7/2006 | Kapur et al. |
| 2006/0190439 A1 | 8/2006 | Chowdhury et al. |
| 2006/0200761 A1 | 9/2006 | Judd et al. |
| 2006/0206803 A1 | 9/2006 | Smith |
| 2006/0217953 A1 * | 9/2006 | Parikh ................ G06F 3/0237 704/1 |
| 2006/0224448 A1 | 10/2006 | Herf |
| 2006/0224593 A1 | 10/2006 | Benton et al. |
| 2006/0248062 A1 | 11/2006 | Libes et al. |
| 2006/0265394 A1 | 11/2006 | Raman et al. |
| 2006/0271520 A1 | 11/2006 | Ragan |
| 2006/0277167 A1 | 12/2006 | Gross et al. |
| 2007/0011167 A1 | 1/2007 | Krishnaprasad et al. |
| 2007/0055652 A1 | 3/2007 | Hood et al. |
| 2007/0082707 A1 | 4/2007 | Flynt et al. |
| 2007/0112739 A1 | 5/2007 | Burns et al. |
| 2007/0136244 A1 | 6/2007 | MacLaurin et al. |
| 2007/0174900 A1 | 7/2007 | Marueli et al. |
| 2007/0195105 A1 | 8/2007 | Koberg |
| 2007/0204039 A1 | 8/2007 | Inamdar |
| 2007/0239724 A1 * | 10/2007 | Ramer ............. G06F 17/30864 |
| 2007/0255831 A1 | 11/2007 | Hayashi et al. |
| 2007/0300185 A1 * | 12/2007 | Macbeth ............... G06F 9/4443 715/825 |
| 2008/0065685 A1 | 3/2008 | Frank |
| 2008/0077883 A1 | 3/2008 | Kim et al. |
| 2008/0082464 A1 | 4/2008 | Ozzie et al. |
| 2008/0104195 A1 | 5/2008 | Hawkins et al. |
| 2008/0114759 A1 | 5/2008 | Yahia et al. |
| 2008/0172362 A1 | 7/2008 | Shacham et al. |
| 2008/0172374 A1 | 7/2008 | Wolosin et al. |
| 2008/0256443 A1 | 10/2008 | Li et al. |
| 2008/0306937 A1 | 12/2008 | Whilte et al. |
| 2009/0031236 A1 | 1/2009 | Robertson et al. |
| 2009/0049052 A1 | 2/2009 | Sharma et al. |
| 2009/0063491 A1 | 3/2009 | Barclay et al. |
| 2009/0070318 A1 | 3/2009 | Song et al. |
| 2009/0077047 A1 | 3/2009 | Cooper et al. |
| 2009/0125374 A1 | 5/2009 | Deaton et al. |
| 2009/0125482 A1 | 5/2009 | Peregrine et al. |
| 2009/0150792 A1 | 6/2009 | Laakso et al. |
| 2009/0210403 A1 | 8/2009 | Reinshmidt et al. |
| 2009/0228439 A1 | 9/2009 | Manolescu et al. |
| 2009/0234811 A1 | 9/2009 | Jamil et al. |
| 2009/0234814 A1 | 9/2009 | Boerries et al. |
| 2009/0239587 A1 | 9/2009 | Negron et al. |
| 2009/0240680 A1 | 9/2009 | Tankovich et al. |
| 2009/0265328 A1 | 10/2009 | Parekh et al. |
| 2009/0277322 A1 | 11/2009 | Cai et al. |
| 2009/0327261 A1 | 12/2009 | Hawkins |
| 2010/0030753 A1 | 2/2010 | Nad et al. |
| 2010/0042912 A1 | 2/2010 | Whitaker |
| 2010/0082661 A1 | 4/2010 | Beaudreau |
| 2010/0094854 A1 | 4/2010 | Rouhani-Kalleh |
| 2010/0106706 A1 | 4/2010 | Rorex et al. |
| 2010/0162183 A1 | 6/2010 | Crolley |
| 2010/0184422 A1 | 7/2010 | Ahrens |
| 2010/0228715 A1 | 9/2010 | Lawrence |
| 2010/0257552 A1 | 10/2010 | Sharan et al. |
| 2010/0268673 A1 | 10/2010 | Quadracci |
| 2010/0280983 A1 | 11/2010 | Cho et al. |
| 2010/0306191 A1 | 12/2010 | Lebeau et al. |
| 2010/0312782 A1 | 12/2010 | Li et al. |
| 2010/0332958 A1 | 12/2010 | Weinberger et al. |
| 2011/0029541 A1 | 2/2011 | Schulman |
| 2011/0047510 A1 | 2/2011 | Yoon |
| 2011/0072492 A1 * | 3/2011 | Mohler ............... G06F 3/04817 726/3 |
| 2011/0078767 A1 | 3/2011 | Cai et al. |
| 2011/0093488 A1 | 4/2011 | Amacker et al. |
| 2011/0131205 A1 | 6/2011 | Iyer et al. |
| 2011/0225145 A1 | 9/2011 | Greene et al. |
| 2011/0252329 A1 | 10/2011 | Broman |
| 2011/0264656 A1 | 10/2011 | Dumais et al. |
| 2011/0295700 A1 | 12/2011 | Gilbane et al. |
| 2011/0314419 A1 | 12/2011 | Dunn et al. |
| 2012/0158685 A1 | 6/2012 | White et al. |

(56) References Cited

U.S. PATENT DOCUMENTS

| | | |
|---|---|---|
| 2012/0198347 A1 | 8/2012 | Hirvonen et al. |
| 2012/0284256 A1 | 11/2012 | Mahajan et al. |
| 2013/0132896 A1 | 5/2013 | Lee et al. |
| 2013/0166525 A1 | 6/2013 | Naranjo et al. |
| 2013/0173513 A1 | 7/2013 | Chu et al. |
| 2013/0219319 A1 | 8/2013 | Park et al. |
| 2013/0290319 A1 | 10/2013 | Glover et al. |
| 2014/0007057 A1 | 1/2014 | Gill et al. |
| 2014/0025502 A1 | 1/2014 | Ramer et al. |
| 2014/0049651 A1 | 2/2014 | Voth |
| 2014/0279013 A1 | 9/2014 | Chelly et al. |
| 2015/0032714 A1 | 1/2015 | Simhon et al. |

FOREIGN PATENT DOCUMENTS

| | | |
|---|---|---|
| JP | 20090285550 A1 | 11/2009 |
| JP | 2011044147 | 3/2011 |
| KR | 20030069127 | 8/2003 |
| KR | 20070014595 | 2/2007 |
| KR | 20110009955 | 1/2011 |
| WO | 2007047464 | 4/2007 |
| WO | 2009117582 | 9/2009 |
| WO | 2010014954 | 2/2010 |
| WO | 2011016665 | 2/2011 |
| WO | 2012083540 A1 | 6/2012 |

OTHER PUBLICATIONS

International Search Authority: "Written Opinion of the International Searching Authority" (PCT Rule 43bis.1) including International Search Report for corresponding International Patent Application No. PCT/US2012/069250; dated Mar. 29, 2013.

International Searching Authority: International Search Report including "Written Opinion of the International Searching Authority" (PCT Rule 43bis.1) for the related International Patent Application No. PCT/US2011/039808; dated Feb. 9, 2012.

*Alice Corp v. CLS Bank International*, 573 US_, 134 S. CT. 2347 (2014).

Foreign Office Action for JP2015-537680 dated Dec. 6, 2016 from the Japanese Patent Office.

Kurihara, et al., "How to Solve Beginner's Problem, Mac Fan Supports" Mac Fan, Mainichi Communications Cooperation, Dec. 1, 2009, vol. 17, 12th issue, p. 92.

Notice of the First Office Action for Chinese Patent Application No. 201280004300.6, State Intellectual Property Office of the P.R.C., dated Oct. 26, 2016.

Chinese Foreign Action dated Mar. 13, 2017 from the State Intellectual Property of the P.R.C. for Chinese Patent Application: 201280004301.0, China.

Kurihara, et al., "How to Solve Beginner's Problem, Mac Fan Supports" Mac Fan, Mainichi Communications Cooperation, Dec. 1, 2009, vol. 17, 12th issue, p. 92, Translated.

Second Office Action for Chinese Patent Application No. 201280004300.6 dated Aug. 23, 2017, SIPO.

"Categories App Helps Organize iPhone Apps on your iPhone's Home Screen," iPhoneHacks, url: http://www.iphonehacks.com/2008/10/categoriesapp.html, pp. 1-4, date of publication: Oct. 5, 2008.

"iOS 4.2 for iPad New Features: Folders," Purcell, url: http://notebooks.com/2010/11/22/ios-4-2-foripad-new-features-folders/, pp. 1-5, date of publication Nov. 22, 2010.

Foreign Office Action for Patent Application No. 201380000403.X dated Jun. 2, 2017 by the State Intellectual Property Office of the P.R.C.

The Second Office Action for Chinese Patent Application No. 201280004301.0 dated Jan. 19, 2018, SIPO.

Chinese Foreign Action dated Sep. 3, 2018 from the State Intellectual Property of the PRC for Chinese Patent Application: 201280004301.0, China.

\* cited by examiner

SYSTEM AND METHOD FOR DYNAMICALLY DISPLAYING PERSONALIZED HOME SCREENS RESPECTIVE OF USER QUERIES

CROSS REFERENCE TO RELATED APPLICATIONS

This application is a continuation of U.S. patent application Ser. No. 13/712,563 filed on Dec. 12, 2012, now allowed, which claims the benefit of U.S. Provisional Patent Application No. 61/653,562 filed on May 31, 2012. The Ser. No. 13/712,563 application is also a continuation-in-part application of U.S. patent application Ser. No. 13/156,999 filed on Jun. 9, 2011, now allowed, which claims the benefit of U.S. Provisional Patent Application No. 61/468,095 filed on Mar. 28, 2011, and U.S. provisional application No. 61/354,022 filed on Jun. 11, 2010. The Ser. No. 13/712,563 application is also a continuation-in-part application of U.S. patent application Ser. No. 13/296,619 filed on Nov. 15, 2011, now pending. The contents of the above-referenced applications are incorporated herein by reference.

TECHNICAL FIELD

The invention generally relates to display of a home screen on a display device, and more specifically to the dynamic display of home screens for devices having a display.

BACKGROUND

In general, home screens are used to navigate through the content of a user's devices such as mobile devices, tablet computers, laptop computers, etc. Navigation through the home screen might be carried out by pressing navigation keys on the device or by manipulating other input devices typically associated with a device, such as a touch screen placed over the device's display. The home screen usually includes a plurality of icons that are static in nature and sometimes are moved from one static display of icons to another by the user. Furthermore, in mobile devices, such as smart phones and tablet computers, the display area is quite limited compared to the display screens typically used by desktop and laptop computer systems.

On mobile devices, the home screen typically operates as a default browser displaying static data in order to fit the variety of data streaming to and from the mobile device. The home screen typically includes icons associated with applications (e.g., a browser, a mobile application or app, etc.), as well as icons associated with documents, files, and so on. The icons are arranged according to users' preferences, but once they are set, the home screen typically cannot be dynamically changed to display a different set of icons not previously configured by the user.

It would be therefore advantageous to provide a solution that overcomes the limitations of the prior art.

SUMMARY

Certain embodiments disclosed herein include a method for dynamically generating and displaying a new home screen on a display of a user device. The method comprises determining a user intent based on at least one input variable dynamically provided in real time; dynamically selecting a plurality of resources of information based on the user intent, wherein each selected resource has a representative icon; generating a new home screen including at least the icons of the plurality of dynamically selected resources; and causing a display of the new generated home screen on the user device.

Certain embodiments disclosed herein also include a system for dynamically generating and displaying a new home screen on a display of a user device. The system comprises a display; a processing unit; and a memory, the memory containing instructions that, when executed by the processing unit, configure the system to: determine a user intent based on at least one input variable dynamically provided in real time; dynamically select a plurality of resources of information based on the user intent, wherein each selected resource has a representative icon; generate a new home screen including at least the icons of the plurality of dynamically selected resources; and cause a display of the new generated home screen on the display.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION

Figure 1:
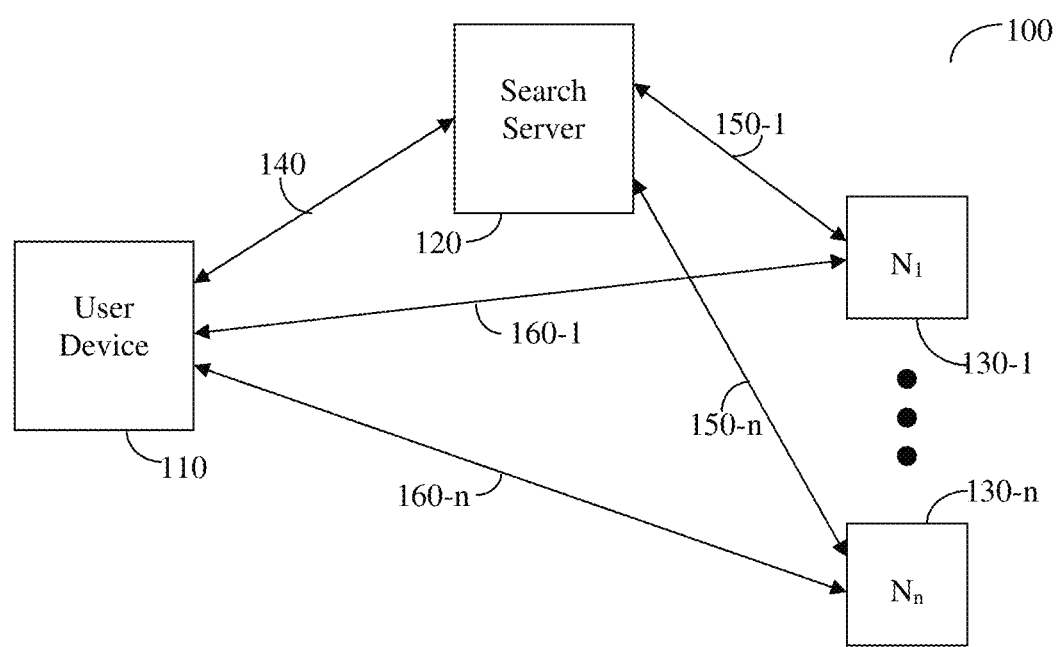
FIG. 1 is a schematic diagram of the operation of the system in accordance with one embodiment.

The various embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In certain exemplary embodiments disclosed herein, a system and method for displaying a personalized dynamic home screen on a device are provided. The system determines an intent based on a query input, one or more environmental variables, or one or more personal variables. The intent represents the type of content, the content, and/or actions that may be of an interest to the user for a current time period. Respective of the intent, the system selects one or more resources of information responsive of the query and displays them on the home screen of the device.

In one embodiment, the system displays an image as a wallpaper on the home screen of the device respective of the intent. In another embodiment, the system may be implemented within an application installed on the device or as part of the device's operating system. The system continuously tracks the environmental or personal variables of the user and upon identification of a change in the intent, and then the system updates the home screen of the device.

FIG. 1 depicts an exemplary and non-limiting schematic diagram of a system 100 utilized for describing certain embodiments disclosed herein. A user device 110 submits a query to a search server 120 over a communication link 140. The search server 120 is configured to receive a plurality of environmental variables. Such variables may include, but are not limited to, search history, time of day, social friends, location, motion information, weather information, sounds, images, sentiment inputs received by the user, and more. The environmental variables may be received from databases (not shown) connected to the search server 120, and from the user device 110. For example, location information can be received by a GPS in the user device 110, while social friends may be received from a database of a social media website. In addition, personal variables, such as a user profile, demographic information related to the user, and so on, can be retrieved by the search server 120 and utilized to determine the user's intent. The search server 120 is configured to determine the user's intent based on the received variables. With this aim, according to an exemplary embodiment, the search server 120 is configured to analyze the context of each variable and correlates the analyzed variable to derive at least a category of interest. The correlation is performed based on the context of the analyzed variables.

In another embodiment, the search server 120 is configured to determine the intent respective of a query or part of a query received from the user and at least one environmental variable (and if provided a personal variable). The search server 120 is configured to process the input query and the received variables to determine the intent. With this aim, according to an exemplary embodiment, the search server 120 is configured to analyze the context of the query and each received variable and correlates the analyzed variables with the query to derive at least a category of interest. The correlation is performed based on the context of the analyzed variables and query. As an example, the search server 120 receives the query "Madonna". The search server 120 is further configured to receive, by a GPS in the user device 110, information that the user is located, for example, at the Brooklyn Museum. The search server 120 is then configured to analyze the query and together with the user's location it is associated with an art category. Respective thereto, the user intent is determined as "art" related.

Once the intent is determined, the search server 120 is configured to select resources from a plurality of resources 130-1 through 130-n that are the most appropriate to fulfill the user's intent. The resources 130 include, but are not limited to, a plurality of web search engines, servers of content providers, vertical comparison engines, servers of content publishers, and so on. The resources 130 may include "cloud-based" applications, that is, applications executed by servers in a cloud-computing infrastructure, such as, but not limited to, a private-cloud, a public-cloud, or any combination thereof. The cloud-computing infrastructure is typically realized through a data center. Although not shown in FIG. 1, the resources 130 may further include mobile applications (also known as apps) and/or widgets currently installed on the user device 110.

The resources 130 may be further arranged according to different categories. For example, if the query term is "Hector Berlioz" then it is most likely that the best answers will be from resources that are capable of handling classical music queries.

In an embodiment, the search server 120 is configured to determine which resources 130 would be the most appropriate resource(s) 130 to address the intent. With this aim, the resources 130 are categorized according to topics of interest, such as "music" or "carpentry tools". The topics of interest are set, for example, by the content provided. The resources 130 are further categorized according to demographic information (i.e., to which demographic group a certain resource may be of interest). The resources 130 may also be registered according to certain keywords. To determine the appropriate resource(s) 130, the search server 120 is configured to match the intent to resources based on the category of each resource. For example, if the intent is "building a bookcase", then resources categorized with topic of interest "carpentry tools" will be selected. Moreover, as will be described herein below, the search server 120 may monitor the corresponding use by the user on the user device 110 to determine which of the resources 130 were the most appropriate for the user, thereby influencing future references provided from that resource.

The search server 120 is further configured to provide a display area containing display segments unique to each of the selected resources 130, which have been determined to be appropriate to address the user's intent. The selected resources communicate directly with their respective display segments on the user device over the communication links 160. The display area may be an application in its own right, such as, but not limited to, a web browser.

In one embodiment, and as further explained herein below, only a portion of the selected resources of the resources 130 are designated with a display segment. Those selected resources that do not have an allocation of a display segment are approached when the user requests, for example, information from additional selected resources. By mere example, there may be thirty selected resources, but the display area may be designed to contain only ten display segments; therefore only the top ten of the selected resources are associated with the display segment. The other selected resources can be associated with the display segment upon a subsequent request for more information made by the user and as further explained below. As a result, it is not necessary for the search server 120 to have any specific information or data regarding the actual content residing on the resource. The only ability needed is to determine which resource of the resources 130 is appropriate to provide a certain answer to the user's intent, thereby potentially becoming a resource trusted by a user of the device 110.

According to certain embodiments, the search server 120 is configured to generate a query respective of the determined intent, or variations thereof, to a resource in a communication format that is proper for that specific resource, thereby enabling search of such resources that require a customized interface to perform any kind of successful processing. The communication links 140, 150, and 160 may occur over a common network such as, but not limited to, a local area network (LAN), a wide area network (WAN), a metro area network (MAN), the world wide web (WWW), the Internet, a wired network, a wireless network, and the like, as well as any combination thereof. The various elements of the system 100 are further described in co-pending U.S. patent application Ser. No. 13/156,999 filed on Jun. 9, 2011 to Kasterstein, et al., titled "SYSTEM AND METHODS THEREOF FOR ENHANCING A USER's SEARCH EXPERIENCE", assigned to common assignee, and which is hereby incorporated by reference for all that it contains.

Figure 2:
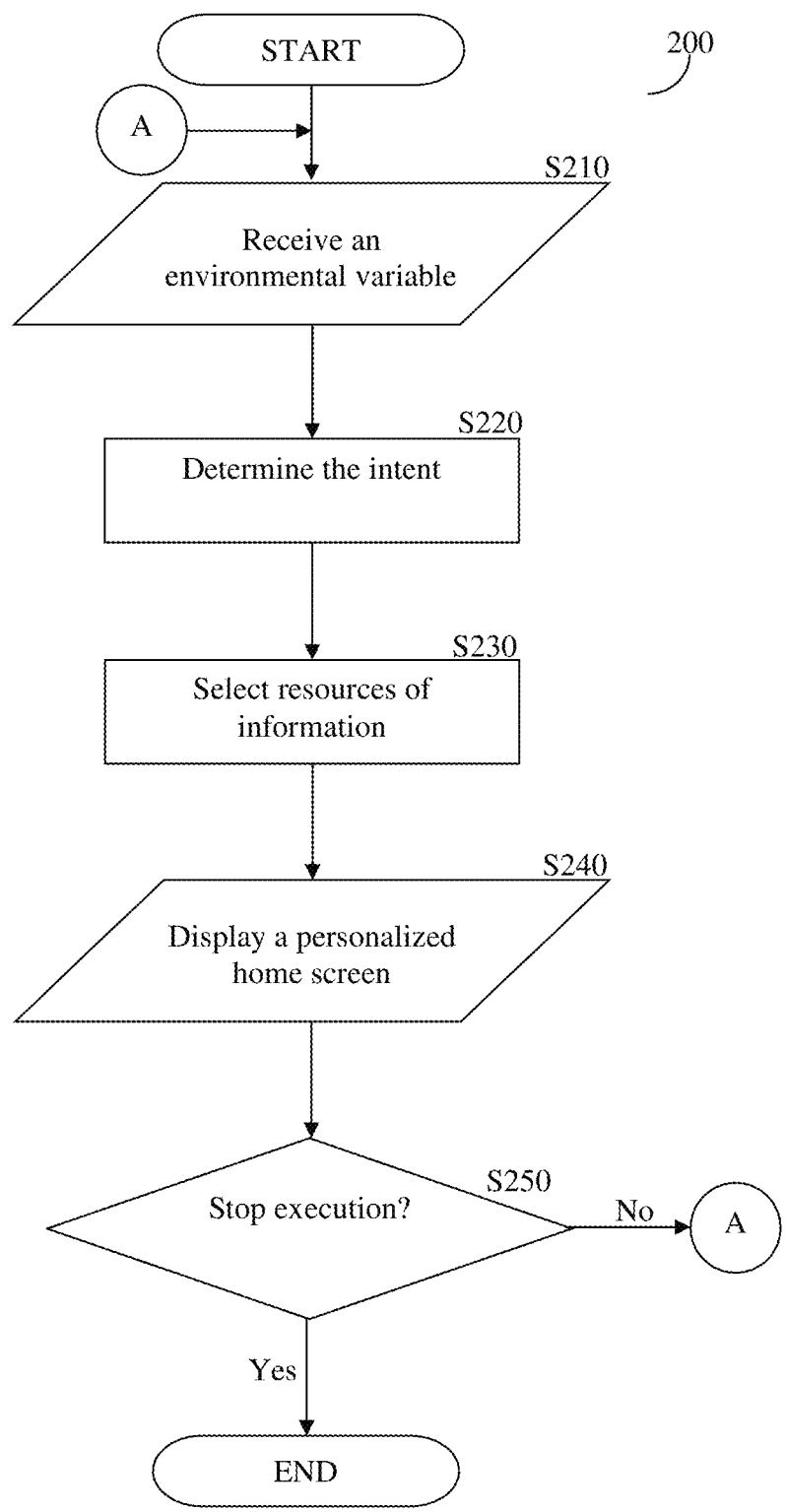
FIG. 2 is a flowchart describing the operation of displaying a dynamic home screen on a device according to one embodiment.

FIG. 2 depicts an exemplary and non-limiting flowchart 200 of a method for generating and displaying a dynamic home screen over a user's device according to one embodiment. In S210, at least one environmental variable is received. An environmental variable may be, for example and not by way of limitation, the location of the user mobile device, the device rate of motion, time of day, and more. In one embodiment, a set of variables may be pre-defined by the system or by the user. For example, "home" means the physical location of the user's home, whereas "morning" could mean any time between 6 am and 10 am.

Optionally, one or more personal variables associated with the user may be retrieved or received. As mentioned above, such variables may include, but are not limited to, a user profile, demographic information, user's preferences, and so on. Such variables may be retrieved or received from systems and databases that generate and/or maintain the variables.

In S220, based on the received variables, the intent of the user is determined. The received variables include at least one environmental variable and optional one or more personal variables. The intent may represent the type of content, the content, and/or actions that may be of an interest to the user at a current time period. In one embodiment, the intent is determined by monitoring at least the received environmental variables (or variables determined by the users to be monitored) to determine any changes in the variables that may in turn change the intent. Then, the changed environmental variables are analyzed to determine the current (updated) intent of the user. The changed environmental variables may be further correlated with the personal variables.

For example, if the time is 8 am on Monday and the user's device location is the user's home, then the intent may be related to "review news" or "review emails". If the location changes to away-from-home, and the GPS information indicates the user is driving, the intent may be changed to receiving traffic updates or listening to the user's favorite radio station during the user's commute. As another example, if the device's motion is determined to be at a rate of a person walking, and the location is determined as $5^{th}$ Avenue in New York City, the user intent may be "nearby shopping stores."

In S230, one or more resources of information (e.g., resources 130) related to the determined intent are selected. For example, if the intent is "review news" (as discussed above), then the selected resources may be one or more news websites or apps (mobile applications) that the user usually reviews. The favorite news websites or apps may be determined, for example, based on a different environmental variable, (e.g., search/browsing history) and/or a personal variable (e.g., a user profile).

In S240, a personalized home screen respective of the selected resources is generated to be displayed on the user's device. Each selected resource is associated with an icon. An icon may be any type of graphical symbol rendered and displayed over the display on the user device. Clicking or tapping on the icon activates an app or provides a link to an information resource (e.g., news website), thereby providing the user with the desired information and/or action. In one embodiment, an icon included in the personalized home screen may be in a form of a widget or a gadget that can activate and/or provide a like to a respective selected resource. It should be noted that the widget or gadget is associated with a resource or information selected as described in detail above.

In S250, it is checked whether it is necessary to stop execution and if so, execution terminates; otherwise, execution continues with S210.

Figure 3:
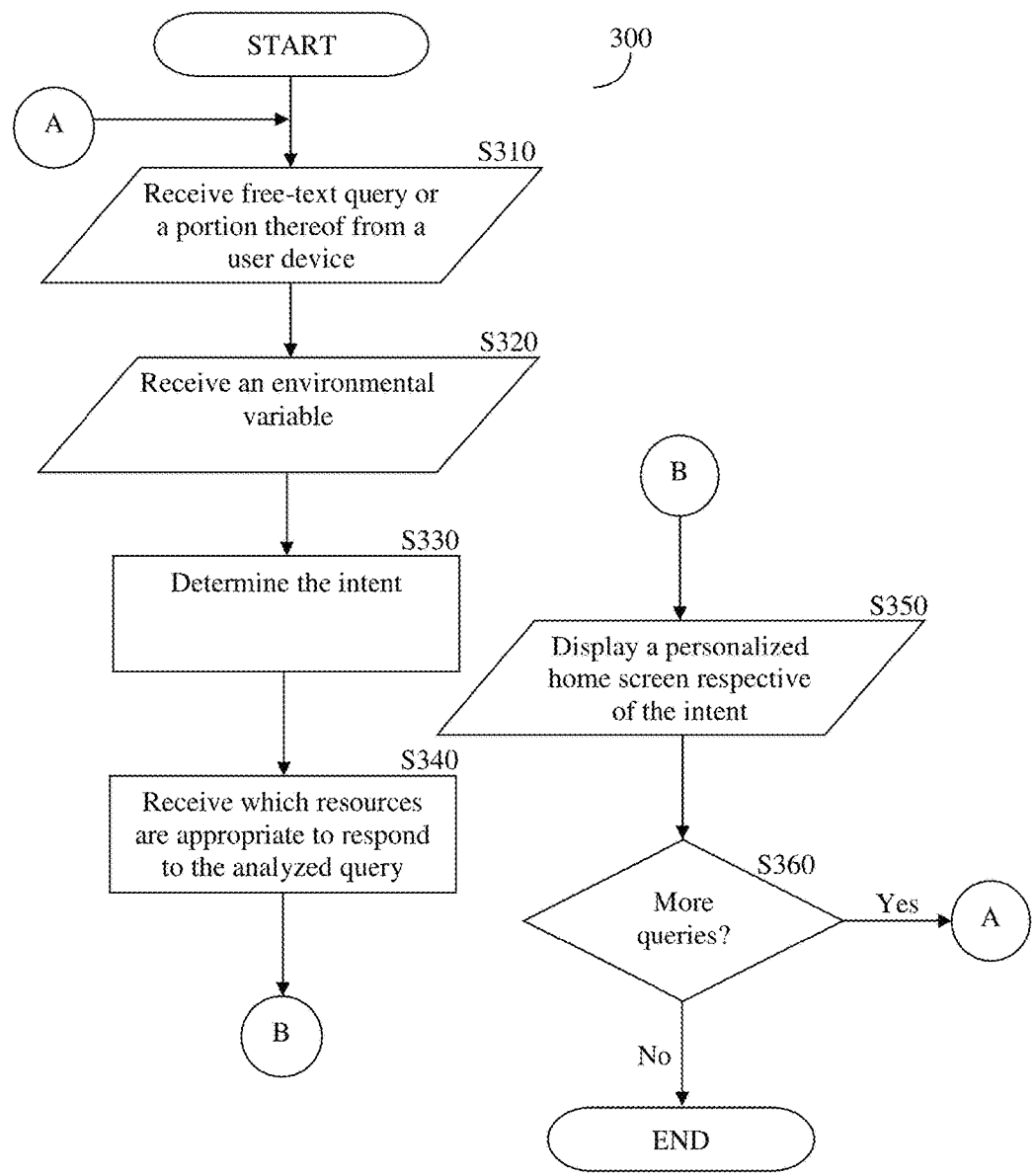
FIG. 3 is a flowchart describing the operation of displaying a dynamic home screen respective of an intent according to another embodiment.

FIG. 3 depicts an exemplary and non-limiting flowchart 300 describing a method for generating and displaying a dynamic home screen respective of a query or part of a query and at least one environmental variable, according to another embodiment. In S310, a query, such as a free-text query, or a portion thereof, is received from a user device, for example, a user device 110. The query may be, for example, a keyword, a portion of a keyword, a plurality of keywords, a character, a series of characters, and the like.

In one embodiment, at least a portion of a query may be automatically completed, and at least a query may be suggested based on, for example, a user experience.

In S320, at least an environmental variable is received. In S330, the user's intent respective of the query is determined based on at least one environmental variable as described in detail above. The user intent can also be determined using one or more personal variables that may be correlated with the environmental variables.

In S340, a list of relevant resources from the plurality of resources (e.g., the resources 130-1 through 130-n) is determined for the received query respective of the determined intent. In S360, a personalized home screen is generated to include the resources determined to be relevant. The generated home screen is displayed over the user's device. As noted above the selected resource is associated with an icon on the generated home screen. An icon may be any type of graphical symbol rendered and displayed over the display of the user device. Clicking or tapping on the icon activates an app (mobile application) or provides a link to an information resource (e.g., news website), thereby providing the user with the desired information and/or action.

As noted above, in one embodiment, an icon included in the personalized home screen may be in a form of a widget or a gadget. It should be noted that the widget or gadget are associated with a resource of information selected as described in detail above. The method discussed with reference to FIG. 3 can be performed by the search server 120.

Following are non-limiting examples for the operation of the method described with reference to FIG. 3. If the user often enters queries related to high-end brands, resources which are occasionally selected by other users who tend to search high-end brands are displayed. The time (given as an environmental variable) of the day the query is entered may be further identified.

As another example, if the user enters the query term "eat" in the morning, results related to breakfast would be displayed, and if the user enters the query term "eat" in the evening, responses related to dinner would be displayed. As another example, if the environmental variable is the temperature at the user's location and the input query is "clothing", resources may be selected respective of the temperature and the term "clothing." Examples for resources that may be displayed in response to the query term "clothing" and the environmental variable temperature indicating "winter season" are on-line stores that sell winter clothing. Again, the selected resources are displayed as icons on the home screen of the user's device.

In yet another example, the environmental variable is the state of motion of the device, indicating if the user is static or moving. Resources are selected and icons associated with the selected resources based on this identification and an input query are displayed. For instance, if the user enters the query term "Pizza" while moving, resources related to Pizza restaurants are selected. If the user enters the query term "Pizza" while in a static mode, resources related to Pizza deliveries are displayed. Again, the selected resources of information are displayed as icons on the home screen of the user's device, thereby the home screen is dynamically changed respective of the query and the corresponding variables.

In S370, it is checked whether there are additional queries to handle, and if so execution continues with S310; otherwise, execution terminates.

A person of ordinary skill in the art would readily appreciate that the operation of displaying a dynamic home screen as described in FIG. 2, and the operation of displaying a dynamic home screen respective of the intent of a query as described in FIG. 3, may be integrated without departing from the scope of the invention.

Figure 4:
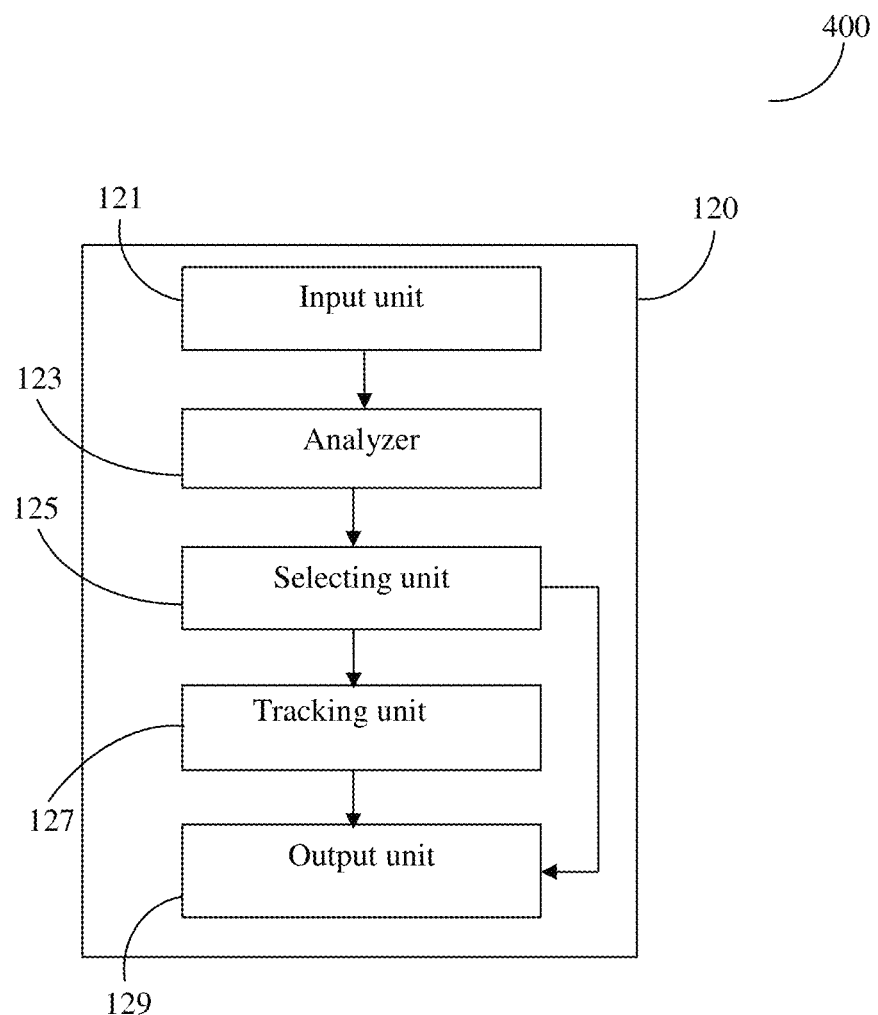
FIG. 4 is a schematic block diagram of a search server in accordance with one embodiment; and, FIGS. 5A and 5B are screenshots of a dynamic home screen of a device showing the operation of the system when the intent changes according to various embodiments disclosed herein.

FIG. 4 depicts an exemplary and non-limiting schematic diagram 400 of the search server 120. According to an exemplary embodiment, the search server 120 includes an input unit 121 for receiving queries from the user's device 110. Through the input unit 121, a plurality of environmental variables is also received. The search server 120 also includes an analyzer 123, a selection unit 125, a tracking unit 127, and an output unit 129. Each of the units may include a processor coupled to a memory (both are not shown).

The analyzer 123 determines the user's intent based one or more environmental variables and in some case using personal variables as discussed in detail above. The analyzer 123 can also determine the intent respective of an input query as discussed above. The selection unit 125 selects at least one resource from a plurality of resources of information respective of the intent and extracts at least an icon or a widget respective of each selected resource. The tracking unit 127 continuously tracks changes of the at least an environmental variable and updates the home screen respective of the changes. The output unit 129 generates a new home screen that includes the extracted icons and causes the device to replace a current home screen with the newly-generated home screen.

Figure 5A:
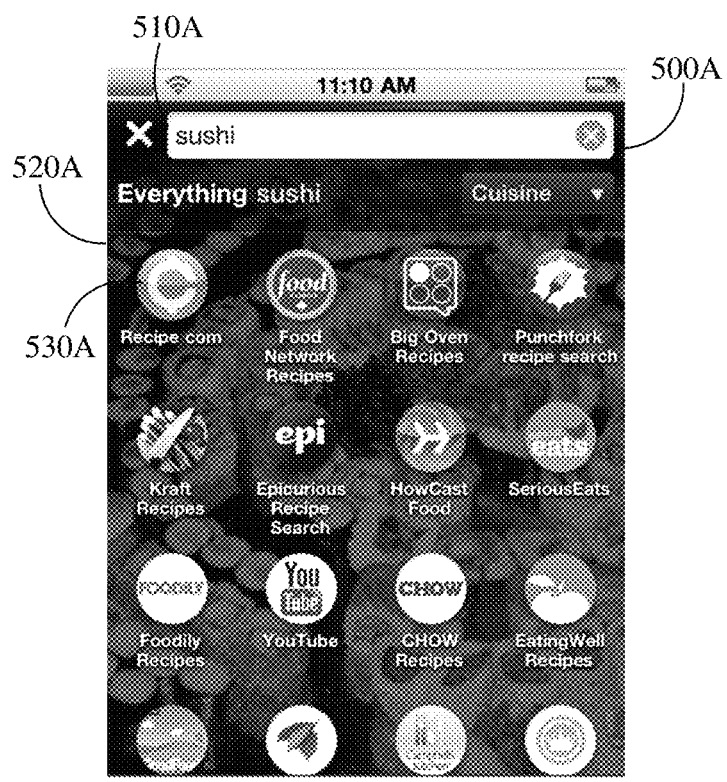
Figure 5B:

FIGS. 5A and 5B depict exemplary and non-limiting screenshots 500A and 500B of a personalized dynamic home screen of a mobile device. In 500A a default home screen with icons is shown. The user may enter a term, for example, the term query "Sushi" in window 510A. In one embodiment, instant wallpaper with one or more pictures respective of the query intent 520A is provided, as described in further detail in co-pending U.S. patent application Ser. No. 13/296,619 filed on Nov. 15, 2011 to Kasterstein, et al., titled "A SYSTEM AND METHODS THEREOF FOR INSTANTANEOUS UPDATE OF A WALLPAPER RESPONSIVE OF A QUERY INPUT AND RESPONSES THERETO," assigned to common assignee, and which is hereby incorporated by reference for all that it contains.

An environmental variable respective of the user's current location is provided to the search server 120, for example, by the Global Positioning System (GPS). The user's current location is used by the search server 120 to determine whether the user is at his home or away.

Screenshot 500A is a home screen being generated in response to the determination that the user is at his home. Accordingly, as the search server 120 identifies the term "Sushi" it displays a wallpaper related to this intent as well as an icon for displaying results respective for the intent, for example, a resource displaying instructions on how to make sushi at home 530A.

Screenshot 500B is a home screen being generated in response to the determination that the user is away from home, and responsive to the query term "Sushi". The screenshot 500B displays as a result, icons related to the new intent, for example, a link to a website 510B specifying the sushi restaurants near the current location of the user.

The various embodiments may be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. The display segments and mini-display segments may be shown on a display area that can be a browser or another other appropriate graphical user interface of an internet mobile application, either generic or tailored for the purposes described in detail hereinabove.

All examples and conditional language recited herein are intended for pedagogical purposes to aid the reader in understanding the principles and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What we claimed is:

1. A method for dynamically generating and displaying a new home screen on a display of a user device, comprising:
   receiving by a computing device at least one input variable dynamically provided in real time;
   dynamically selecting, by the computing device, a plurality of resources of information based on a determined user intent, wherein each selected resource has a representative icon, wherein the user intent represents a determination by the computing device, based on an analysis of a context of the at least one input variable, of at least one of a type of content, a content, and an action of interest to the user for a current time period;
   generating a new home screen for the user device including an area with display segments for each of at least a subset of the selected plurality of resources, wherein the icon of the plurality of dynamically selected resources of the subset are displayed in the respective display segment for that resource; and causing a display of the new generated home screen on the user device, wherein each of the display segments is configured to communicate directly over a network with its respective one of the plurality of resources.

2. The method of claim 1, wherein each of the at least one input variable is at least one of: an environmental variable and a personal variable.

3. The method of claim 2, wherein each personal variable is any of: a user profile, demographic information, and user preferences.

4. The method of claim 2, wherein each environmental variable is any of: a location of the user device, a rate of motion of the user device, search history, browsing history and a time of day.

5. The method of claim 1, wherein the determination by computing device of the user intent further comprises:
   determining the context of the at least one input variable; and
   determining a category of interest based on the context of the at least one input variable, wherein the user intent is determined as the category of interest.

6. The method of claim 1, further comprising:
   receiving at least a portion of a user query.

7. The method of claim 1
   wherein the computing device is the user device.

8. The method of claim 6, wherein the user query is at least one of: a keyword, a portion of a keyword, a plurality of keywords, a character, and a series of characters.

9. The method of claim 8, wherein the user query is automatically completed based on the determined user intent.

10. The method of claim 1, wherein each representative icon is any one of: a graphical symbol, a widget, and a gadget that causes to either activate or provide a link to the at least one selected resource of information.

11. A non-transitory computer readable medium having stored thereon instructions for causing one or more processing units to execute the method according to claim 1.

12. A system for dynamically generating and displaying a new home screen on a display of a user device, comprising:
   a display;
   a processing unit; and
   a memory, the memory containing instructions that, when executed by the processing unit, configure the system to:
   receive by a computing device at least one input variable dynamically provided in real time;
   dynamically select, by the computing device, a plurality of resources of information based on a determined user intent, wherein each selected resource has a representative icon, wherein the user intent represents a determination by the computing device, based on an analysis of a context of the at least one input variable, of at least one of a type of content, a content, and an action of interest to the user for a current time period;
   generate a new home screen for the user device including an area with display segments for each of at least a subset of the selected plurality of resources, wherein the icon of the plurality of dynamically selected resources of the subset are displayed in the respective display segment for that resource; and
   cause a display of the new generated home screen on the display, wherein each of the display segments is configured to communicate directly over a network with its respective one of the plurality of resources.

13. The system of claim 12, wherein each of the at least one input variable is at least one of: an environmental variable, and a personal variable.

14. The system of claim 13, wherein each personal variable is any of: a user profile, demographic information, and user preferences.

15. The system of claim 13, wherein each environmental variable is any of: a location of the user device, a rate of motion of the user device, search history, browsing history and a time of day.

16. The system of claim 12, wherein the system is further configured to:
   determine the context of the at least one input variable; and
   determine a category of interest based on the context of the at least one input variable, wherein the user intent is determined as the category of interest.

17. The system of claim 12, wherein the system is further configured to:
   receiving at least a portion of a user query.

18. The system of claim 17, wherein the computing device is the user device.

19. The system of claim 18, wherein the at least a portion of the user query is at least one of: a keyword, a portion of a keyword, a plurality of keywords, a character, and a series of characters.

20. The system of claim 19, wherein the user query is automatically completed based on the determined user intent.

21. The system of claim 12, wherein each representative icon is any one of: a graphical symbol, a widget, and a gadget that causes to either activate or provide a link to the at least one selected resource of information.

* * * * *